United States Patent [19]
van Dorsselaer

[11] Patent Number: 4,937,677
[45] Date of Patent: Jun. 26, 1990

[54] METHOD OF ENLARGING/REDUCING DITHERED IMAGES

[75] Inventor: Etienne L. M. E. van Dorsselaer, Sintjansteen, Netherlands

[73] Assignee: Oce-Nederland B.V., Venlo, Netherlands

[21] Appl. No.: 362,076

[22] Filed: Jun. 6, 1989

Related U.S. Application Data

[63] Continuation-in-part of Ser. No. 879,001, Jun. 26, 1986, abandoned.

[30] Foreign Application Priority Data

Jun. 27, 1985 [NL] Netherlands .................. 8501845

[51] Int. Cl.⁵ ............................................. H04N 1/40
[52] U.S. Cl. ..................................... 358/456; 358/287
[58] Field of Search ....................... 358/283, 287, 280

[56] References Cited

U.S. PATENT DOCUMENTS

| | | |
|---|---|---|
| 4,730,221 | 3/1988 | Roetling .............................. 358/298 |
| 4,758,897 | 7/1988 | Hiratsuka ............................ 358/283 |
| 4,766,499 | 8/1988 | Inuzuka .............................. 358/283 |
| 4,775,886 | 10/1988 | Hirosawa ........................... 358/283 |
| 4,796,094 | 1/1989 | Van Dorsseater .................. 358/283 |
| 4,800,443 | 1/1989 | Crinon et al. ...................... 358/283 |
| 4,803,558 | 2/1989 | Hiratsuka ........................... 358/283 |

Primary Examiner—Edward L. Coles, Sr.
Attorney, Agent, or Firm—Reed, Smith, Shaw & McClay

[57] ABSTRACT

The entire dithered image to be enlarged/reduced is divided into contiguous relatively small areas, called input areas, and the pixel pattern of each input area is represented by (i) an average gray level characterized by a standard pixel pattern and (ii) the pixels deviating from the standard pattern. Every input area is imaged onto an output area according to the enlargement/reduction factor, whereby the output area is filled with a standard pixel pattern yielding the average gray level of the input area and extra pixels are added to the standard pattern for the deviating pixels of the input area on locations determined by linear transformation.

13 Claims, 4 Drawing Sheets

METHOD OF ENLARGING/REDUCING DITHERED IMAGES

CROSS REFERENCE TO RELATED APPLICATION

This application is a continuation-in-part application of Ser. No. 06/879,001 filed on June 26, 1986 now abandoned.

FIELD OF THE INVENTION

The present invention relates to a method of enlarging and reducing dithered images obtained from a rastered gray level image by means of a dither matrix.

BACKGROUND OF THE INVENTION

Methods of dithering analog image information are known per se, e.g., *A Survey of Electronic Techniques For Pictorial Image Reproduction*, 8089 IEEE Transactions Vol. Com - 29 (1981) Dec. No. 12. Generally, in these methods, an image for dithering is scanned dot by dot by suitable means and the gray level of each dot is determined. The resulting raster of gray levels is then subdivided into contiguous sub-rasters, the dimensions of which correspond to those of a dither matrix filled by an arbitrarily preselected distribution of all the gray level thresholds possible within a sub-raster. In each subraster the gray level of each raster dot is then compared with the corresponding threshold from the dither matrix. If the gray level is greater than the threshold, the associated raster dot is allocated a logic "1" while if the gray level is lower than the threshold the associated raster dot is allocated a logic "0". In this way, the analog image information is converted to a raster of two-level pixels or picture elements by means of which, for example, it is possible to control a printer to display the image, or by means of which the image information can be transmitted over transmission lines, e.g., in facsimile applications. See also, for example, U.S. Pat. No. 4,266,249; IBM Tech. Discl. Bul. Vol. 20 No. 12 (1978) and European Application No. A2 00 24902 in which gray scale values of pixels are determined by splitting the image data into high and low frequency components.

In many cases it is necessary or desirable to be able to enlarge or reduce the image whose information is present in dithered form. In the case of facsimile transmission, reduction may be desirable in order to reduce the number of bits for transmission and hence the required transmission line bandwidth. In displaying an image using the dither information it may be necessary to adapt the information to the resolution of the printer in such a way that the resulting print has a predetermined size.

Enlargement or reduction of the image by a given factor may also be required by a user. For example, a method of reducing/enlarging an image is described in U.S. Pat. No. 4,394,693 in which to reduce an image a number of rows and columns are simply omitted depending upon the required reduction factor. To attain a reduction having a factor a/b, b-a lines/columns are omitted from each group of b lines/columns of the input image in order to give the required output image. The number of lines/columns (b-a) to be omitted is distributed as uniformly as possible over the group b lines/columns.

Similarly, to enlarge an image, a number of rows and columns are added. To obtain an enlargement having a factor c/b, c-b lines/columns are added to each group of b lines/columns of the input image. Here again the number of lines/columns (c-b) to be added is distributed as uniformly as possible over the group of b lines/columns. Each of the added lines/columns has the same pixel pattern as one of the neighboring lines/columns.

While this method can give acceptable results in the case of pure black/white images, such as drawings, a number of problems arise if the method is used in connection with dithered images containing several gray levels, e.g., photographs and the like.

Moire distortion occurs due to the more or less uniform structure in which the pixels are removed from the pixel raster in the case of reduction or with the addition of lines/columns to the raster in the case of enlargement. The uniform structure with which the pixels are omitted or added interferes with the uniform structure present in the dithered photographs as a result of the dithering method.

Moire distortion does not occur in the reduction of an image in those cases in which the omission pattern is in synchronism with the dither matrix used. This situation, however, occurs only in a very restricted number of cases, e.g., when an $8 \times 8$ dither matrix is used and the reduction is from 4 to 3. In that case, however, there is another important disadvantage which arises because those pixels corresponding to one and the same part of the dither matrix are consistently omitted. These omitted pixels represent a number of specific gray level thresholds, and by omitting all the pixels associated with these specific gray level thresholds the number of gray levels in the reduced image is greatly reduced. In the example of an $8 \times 8$ dither matrix and a reduction from 4 to 3, the number of gray levels decreases from 65 to 37 or from 33 to 19, respectively, (if each threshold occurs twice in the $8 \times 8$ matrix).

Attempts have been made to counteract the formation of Moire patterns by omitting or adding pixels in accordance with an arbitrary scheme such that the positions where pixels are omitted or added are not longer situated in a fixed structure. This gives an improvement in the quality of the resulting reduced image, inasmuch as the Moire distortion is more or less reduced. However, the noise in the image increases visibly with such a method so that optimum results are not obtained.

More particularly, if the display means is capable of printing or displaying each pixel with high accuracy and high fineness, the image noise produced by the method becomes very perceptible. Reducing or eliminating Moire patterns by omitting or adding the pixels in accordance with an arbitrary scheme is then replaced by a sharp increase in the noise in the image without there being any real quality improvement.

Another disadvantage of the known method is the fact that it is not possible to use excessively large reduction factors because with large reduction factors a relatively large number of pixels have to be omitted, and hence a relatively large part of the information content of the image.

Accordingly, it is an object of the present invention to provide a method by which a dithered image can be reduced or enlarged while using a wide range of conversion factors, so that the information content of the original image remains unaffected or substantially unaffected. It is a further object of the invention to provide a method in which the occurrence of Moire distortion is avoided and the signal/noise ratio of the image is affected insignificantly, if at all.

SUMMARY OF THE INVENTION

In accordance with the present invention a method is provided for enlarging/reducing a dithered image obtained from a rastered gray level image by means of a dither matrix. Generally, the method comprises (a) defining contiguous input areas of b×b picture elements (pixels) in the dithered image, which input areas have to be imaged with a conversion factor of a/b on output areas of a×a pixels;

(b) selecting from a series of standard patterns, each obtained by dithering, with a first dither matrix, an area filled uniformly with a unique gray level, that standard pattern which most closely approximates the dither pattern in the input area and allocating the gray level associated with the selected standard pattern to the input area as the so-called average gray level of the input area;

(c) determining the pixels in the input area and allocating the gray level associated with the selected standard pattern to the input area as the so-called average gray level of the input area which deviate from the determined standard pattern;

(d) generating, for each output area, by means of a second dither matrix, a standard pattern corresponding to the gray level determined for the corresponding input area; and (e) determining, from the position of each of the deviating pixels within the input area, by linear transformation, the position of a corresponding pixel within the output area and allocating that pixel in the output area the same level as the deviating pixel in question in the input area.

The invention is based on the discovery that conversion should not act directly on individual pixels, but must act on the pattern of the pixels or on the gray level of an area itself without affecting the pattern of the area. Therefore, the entire image is divided into a number of contiguous, relatively small, input areas and it is assumed that local variation in intensity will be small within these input areas. On this basis, the pattern in each area is divided into a pattern corresponding to an average gray level and a number of pixels deviating therefrom, which together form the high-frequency component of the area. Since, in the case of enlargement or reduction of an image, the gray level of each of the input areas will not change, this gray level can be transferred directly to the output area. The high-frequency pixels are then imaged on the associated output area by a linear coordinate transformation.

Although it has been assumed hereinbefore that the intensity variations in each input area will be small, it has been found in practice that the method according to the invention also gives good results if a considerable variation can be signaled in a number of areas.

In order to reduce the number of operations to be carried out during the enlargement or reduction processing, preferably the number of different thresholds of the second dither matrix used in generating the standard pattern for the output areas is selected so as to be equal to the number of different thresholds of the first dither matrix.

It is possible to further reduce the number of steps by allocating for each of the deviating pixels an amplitude level equal to the difference between the threshold associated with th(R)pixel from the first dither matrix and the average gray level, and image on to the corresponding output area only those deviating pixels whose amplitude is greater than a predetermined threshold. By the introduction of a threshold, only those deviating pixels of the input area which differ adequately from the average gray level of the associated input area are imaged on the corresponding output area. It has been found in practice that a correct choice of this threshold makes the signal/noise ratio of the reduced or enlarged image substantially equal to that of the original image.

In order to determine the average gray level of each input area faultlessly it is preferable that the dimensions (i.e., the numbers of rows and columns of elements) of each input area be equal to the dimensions of the first dither matrix or a whole multiple thereof. This has effect of that in determining the average gray level of an input area each threshold in the dither matrix is involved an equal number of times in the determination.

The dimensions of the first dither matrix will not in all cases correspond to the dimensions of the input areas. If there is no conformity, it is preferable to take steps to maintain the dither structure in the input areas. In this connection, another embodiment of the invention is provided in which if the dimensions of the first dither matrix are not equal to the dimensions of the input areas in step b above, use is made each time of an auxiliary matrix, which is to be determined separately for each input area, and which is found by placing a contiguous array of first dither matrices on the contiguous array of input areas, the thresholds of the dither matrices which fall within each area together forming the auxiliary matrix for that area.

Generally, the dimensions of each output area will not be equal to a whole multiple of the dimensions of the dither matrix used. This is particularly so if the first dither matrix is also used for the output areas. To ensure that the required dither structure of the output image is not effected, it is preferable if to generate the standard patterns associated with the gray levels of the output areas in step d above use is made in each case of an auxiliary matrix. The auxiliary matrix is determined separately for each area, by placing a contiguous array of second dither matrices on the contiguous array of output areas, the thresholds of the dither matrices which fall within each area together forming the auxiliary matrix for that area. The effect of this is that a shift in the dither matrix is brought about for each area separately both in the direction of the row and in the direction of the column. This shift is such that if all these auxiliary matrices are placed next to one another on the output areas the required continuous dither structure is obtained.

Other advantages of the present invention will become apparent from a perusal of the following preferred embodiments for performing the various steps of the methods and means for accomplishing the various steps to be performed taken in connection with the accompanying drawings.

BRIEF DESCRIPTION OF THE DRAWINGS

FIG. 1 represents an 8×8 dither matrix used in a number of examples which are described hereinafter in which each gray level threshold 1–32 occurs twice in the total.

FIG. 2 represents a number of contiguous dither matrices according to FIG. 1 to demonstrate the occurrence of Moire patterns in the reduction of an image.

FIG. 7a represents an example of a 4×4 dither matrix, in which each gray level threshold occurs once.

FIG. 7b represents a standard gray level pattern produced by means of the dither matrix of FIG. 7a for the threshold 5.

FIG. 7c represents a gray level pattern for the threshold 5, deviating from the standard pattern.

FIG. 8 represents a number of contiguous dither matrices according to FIG. 7a to explain the method according to the invention of dithering the reduced image.

PRESENTLY PREFERRED EMBODIMENTS

Figures 1, 2:
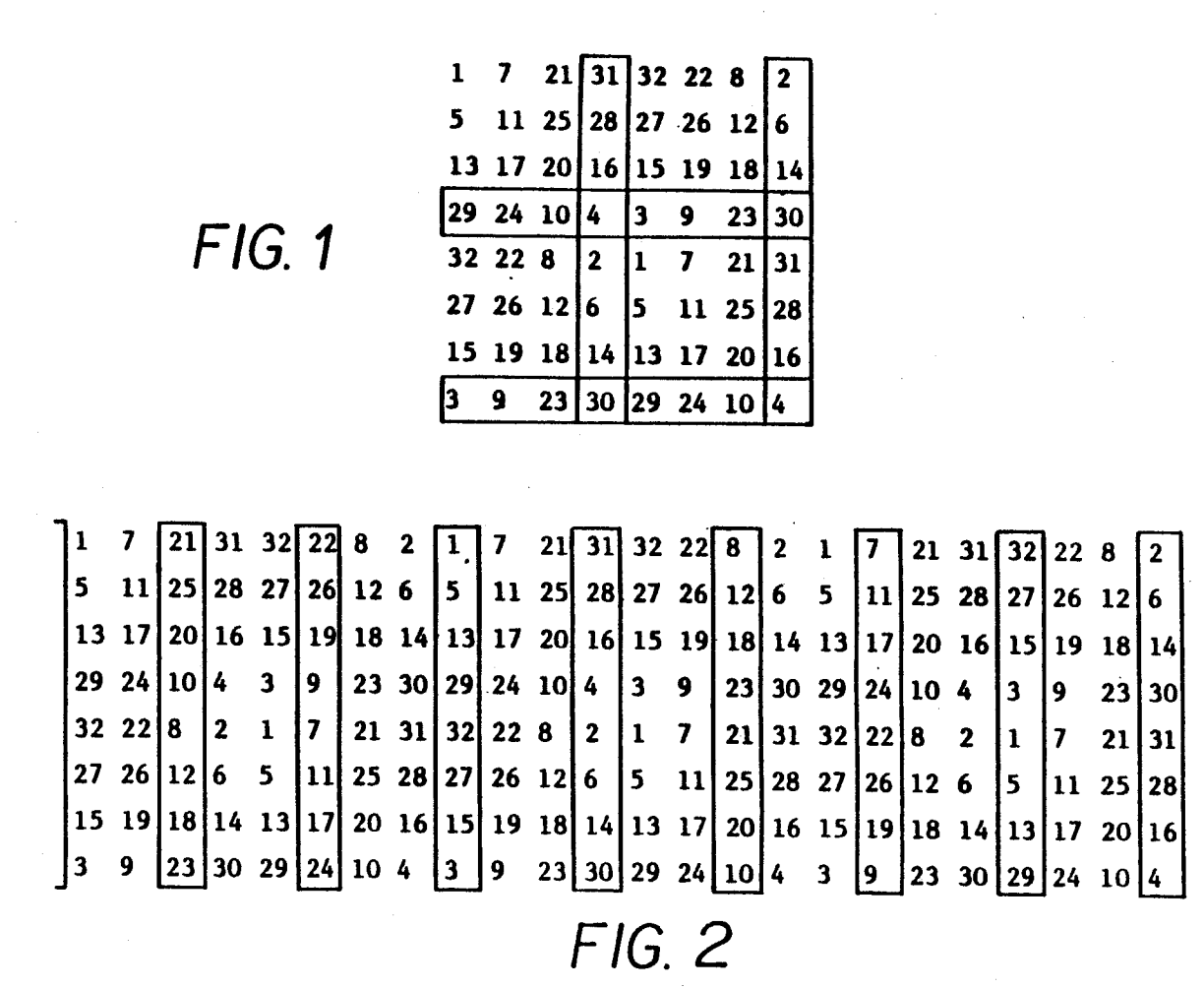

The disadvantages of the prior art will become apparent from reference to FIGS. 1 and 2 and the following description in which FIG. 1 represents an 8×8 dither matrix in which each gray level threshold 1-32 occurs twice in the total. If a gray level image converted to a raster of two-level pixels with this dither matrix is to be reduced, for example by a factor ¾, by prior art methods, one line/column is omitted after each three lines/columns. The lines/columns omitted are shown framed in FIG. 1. It is apparent from FIG. 1 that with a conversion factor of ¾ all the pixels associated with the gray level thresholds 31, 28 ... (fourth column), 2, 6 ... (eighth column), 29, 24, ... (fourth row) and 3, 9, ... (eighth row) disappear from the complete picture. This means that the number of gray levels in the reduced image is reduced from 32+1 to 18+1. Although Moire distortion does not occur in this case, the picture quality is considerably impaired by the considerable reduction of the number of gray levels.

With other less "pleasant" conversion factors, e.g., ⅝, this loss of pixels all associated with one or more specific gray level thresholds will not occur, but Moire pattern do occur in that case due to interference. The periodicity arising in the reduced image due to the omission of columns, e.g., with the 8×8 dither matrix of FIG. 1 and a conversion factor of ⅝, is represented in FIG. 2. In FIG. 2, a number of dither matrices according to FIG. 1 are placed side by side as occurs during dithering of an image. It is clear from FIG. 2 that a repeating pattern of gray level columns occurs which are absent in each case, thus causing the Moire distortion. In practice this distortion leads to a considerable impairment of the image quality.

Figures 3, 4A, 4B:
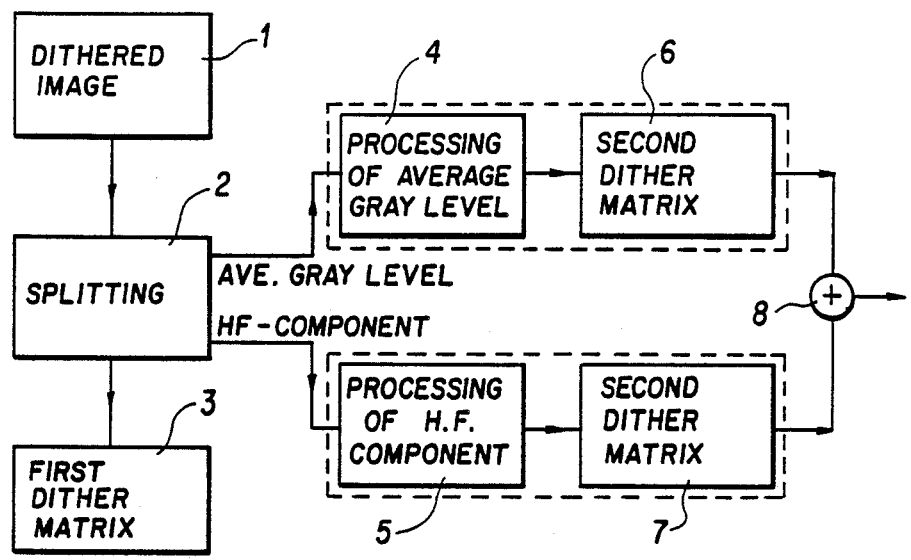
FIG. 3 diagrammatically represents the method according to the invention.
FIG. 4a represents a standard gray level pattern produced by means of the dither matrix of FIG. 1 for the threshold 7.
FIG. 4b represents a standard grey level pattern produced by means of the dither matrix of FIG. 1 for the threshold 23.

FIG. 3 diagrammatically represents the method used according to the invention. In block 2 the dithered image information 1 is split, by means of the same dither matrix 3 as was used for dithering the original image, into a series of average gray levels and an associated series of high-frequency components. Each of the elements from the two series is then subjected to an enlargement or reduction processing in the respective blocks 4 and 5 and then again dithered in the respective blocks 6 and 7. It should be noted that the blocks 4 and 6, or 5 and 7, respectively, can also be combined as shown in dotted lines in FIG. 3, depending on the operations applied, which will be discussed in detail hereinafter. The associated components of the two series are then recombined at junction point 8 to give the reduced or enlarged dithered image. Each of the various operations of FIG. 3 will be described in greater detail hereinafter.

According to the invention, it is assumed that the intensity variation in a photograph or similar image is generally not excessive locally. If, therefore, a total image is divided up into a raster of contiguous small subareas, such subarea will have a specific average gray level and there will also occur in each subarea deviations from this average gray level, hereinafter referred to as the high-frequency component, which deviations, however, will not be excessive in accordance with the above assumption.

In the enlargement or reduction of an image divided up into input areas of b×b pixels, each input area is imaged on an output area of a × a pixels, the enlargement or reduction ratio being equal to a/b. If the information from each input area is now divided up in the above manner into an average gray level and a high-frequency component deviating from this gray level, it will be apparent that the gray level does not change when an input area is imaged on an output area. For imaging this average gray level on the output area, therefore, the output area must be filled with a pattern of pixels corresponding to this same average gray level. For purposes of explanation, it will be assumed hereinafter that the second dither matrix is equal to the first dither matrix.

The average gray level of an input area can be determined (in block 2 in FIG. 3) by comparing the pixel pattern of the input area (originating from block 1 in FIG. 3) with a series of standard patterns. These standard patterns arise by dithering, with the dither matrix (originating from block 3 in FIG. 3), a number of image areas each filled with a unique gray level from the series of possible different gray levels.

FIG. 4 represents two possible standard patterns dithered with the matrix represented in FIG. 1. FIG. 4a represents the standard pattern obtained when dithering a uniform area with a gray level above threshold 7 but below threshold 8. FIG. 4b represents a standard pattern obtained when dithering a uniform area with a gray level above threshold 23 but below threshold 24. As can be appreciated a series of 32 standard patterns is associated with the dither matrix represented in FIG. 1. Generally, however, a series of $n^2$ standard patterns is associated with an n×n dither matrix in which each threshold occurs only once.

By comparing the pixel pattern of an input area with the series of standard patterns, it is possible to find that standard pattern which, on comparison, gives the smallest number of deviating pixels. This standard pattern then represents the average gray level of the pixels pattern in the input area. The pixels in the pixel pattern of the input area which deviate from this selected standard pattern form the high-frequency component of the input area. These pixels are found by comparing the selected standard pattern with the pixel pattern of the input area.

Figure 5:
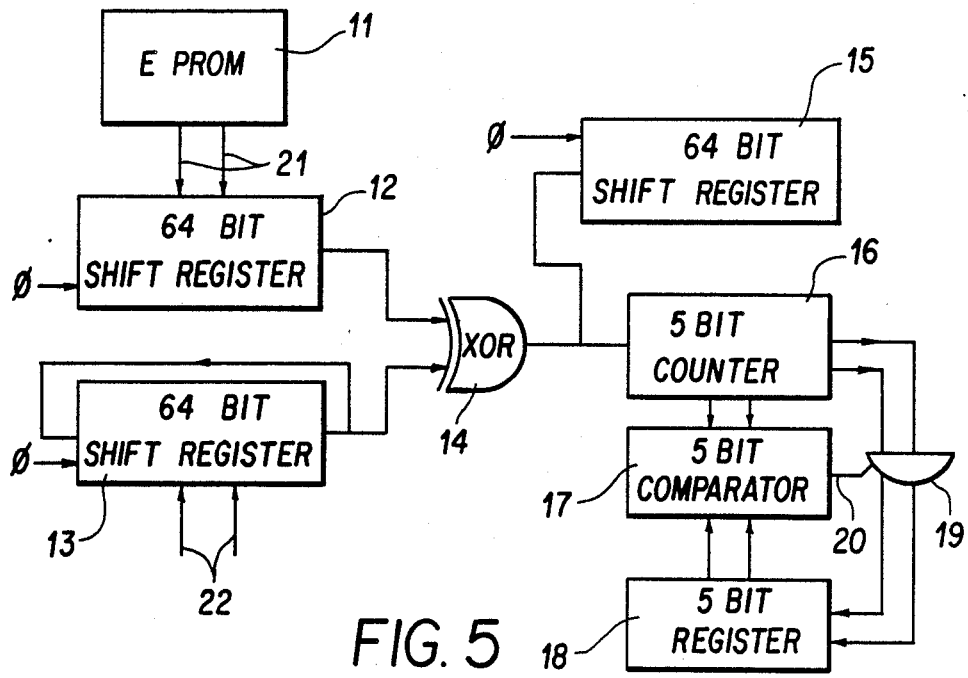
FIG. 5 diagrammatically represents a circuit for determining the average gray level.

FIG. 5 represents a circuit provided with a memory 11 of the EPROM type. All possible standard patterns are beforehand stored in this memory in an ascending gray level sequence. These standard patterns need only be determined once for the dither matrix used. The circuit of FIG. 5 is also provided with two shift registers 12 and 13. The pixel pattern of an input area is fed to the shift register 13 at the beginning of a comparison procedure via the 64-bit line 22. The shift register 13 is in a feedback circuit. A next standard pattern is fed from the memory 11 to the shift register 12 after every 64 shift pulses. The outputs of the last stages of the shift registers 12 and 13 are connected to the inputs of an exclusive OR gate 14, the output of which is connected on the one hand to the 5-bit counter 15 and, on the other hand, to the 64-bit shift register 15. By the synchronous feed of shift pulses to both shift registers 12 and 13 the pixel pattern of an input area in register 13 is compared each time with a standard pattern in the register 12. A "1" is delivered at the output of gate 14 if no equality is found between the two patterns for a specific picture point. In that case the 5-bit counter is raised one step.

The shift clock pulses 0 are also fed to the 64-bit shift register 15, in which, therefore, the deviating pixels are stored for each standard pattern.

At the end of the standard pattern the 5-bit comparator 17 determines whether the value accumulated in the counter 16 is less than the value in a 5-bit register 18 which at the start of the comparison procedure was filled with all "1's". If the contents of the counter 16 are less than those of the register 18, gate 19 is opened and the contents of the counter 16 are written in the register 18 instead of the value previously present therein. Comparison with the next standard pattern then starts.

Since the standard patterns in the EPROM 11 are stored in sequence, the comparison procedure can be stopped as soon as the value accumulated at any time in the counter 16 starts to rise again, in other words as soon as the comparator 17 determines that the value in the counter 16 is greater than the value in the register 18. At that moment the standard pattern corresponding to the average gray level of the input area is situated in the shift register 12 and the high-frequency component, i.e., the pattern of those pixels which deviate from the average gray level, is situated in the register 15.

It will be apparent that the entire comparison procedure can also be performed by means of a suitably programmed processor. In many cases, however, the speed at which the comparison operation is to be performed will be subject to stringent requirements. It has been found that the hardware solution of which FIG. 5 represents an example generally operates considerably faster than the software solution.

No details are given of the software solution because it is considered that it is within the knowledge of a person skilled in the art to devise a corresponding program on the basis of the information given above.

It is possible for the entire comparison procedure to be performed faster if both the average gray level component and the high-frequency component and also the pixel pattern of each input area are regarded as a vector and the special characteristics of these vectors are taken into account.

The following vector are defined;
y = the pixel pattern of the input area
b = the pixel pattern of the average gray level component
h = the pixel pattern of the hf component. For these vectors, $y = b \oplus h$ with $\oplus$ = modula-2 sum applies.

In comparing the pixel pattern of an input area with the various standard patterns, the hamming distance is in actual fact determined between b and y. The Hamming distance can be regarded as the number of positions in which b and y differ from one another.

Each of the possible vectors b can be allocated a unique weight directly associated with the associated gray level. If the gray level is equal to i, the number of 1's in the associated vector $b_i$ is equal to $2_i$ (if the dither matrix of FIG. 1 is used. In dither matrices in which each threshold occurs only once, the number of ones is equal to i). The vectors $b_i$ can be ordered in ascending sequence by reference to this weight (this order has in fact already been used in FIG. 5 in storing the standard patterns in the memory 11). From this characteristic of the vectors $b_i$ and from the hypothesis that there will be no strong variations in each input area, it follows that a good estimate c can be used for the average gray level $c_i$ of an input area by counting the number of 1's in an input area. If the high-frequency component h = 0, this estimate is in fact perfect. If, therefore, the comparison procedure does not start with a standard pattern at one of the ends of the series, as is done in FIG. 5, but starts at the estimated value c, then it is very probable that already after a few comparisons in which i is increased by 1 or is reduced by 1 each time, that pattern will be found with which the Hamming distance is minimal.

Figure 6:
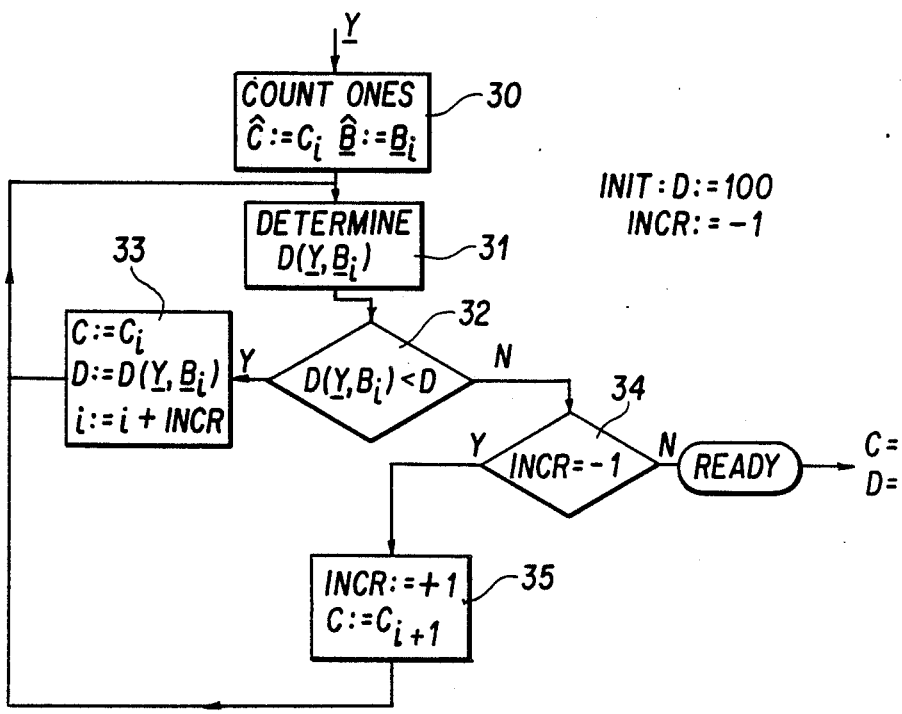
FIG. 6 diagrammatically represents a flow diagram of a method of determining the average gray level.

FIG. 6 represents, in the form of a flow diagram this time, how this modified comparison procedure can be performed. As will be apparent from FIG. 6, the pixel pattern of the input area or the vector y is introduced in block 30, in which the number of ones in this pattern is counted, to give an estimated average gray level c, whereafter on the basis of this number of ones $c_i$ and $b_i$ are allocated an associated value. The Hamming distance $d(y, b_i)$ is then determined in block 31 for this specific gray level vector $b_i$. Block 32 checks whether the determined Hamming distance is less than a variable d which is initially set to a value above the number of thresholds, e.g., 100. If this is the case, the variables c and d are set to new values in block 33, the variable i is reduced by 1 (incr = $-1$) and then block 31 is returned to, in order to redetermine the Hamming distance for the new $b_i$. Ever-smaller values of d are sought in one direction by reducing i. If block 32 gives a negative result, block 34 checks whether the step variable incr is positive or negative. This step variable was initially made negative and in the first instance the block 34 will accordingly give the answer "yes", resulting in making the variable incr in block 35 positive and increasing the value c. Block 31 is then returned to again and the smallest Hamming distance is again sought with increasing values of i.

If block 34 gives a negative result, the comparison procedure is completed. The values allocated at that moment to c and d are the final requested values for the uniform gray level (from which the associated vector $b_i$ can be directly derived) and for the associated minimal hamming distance d.

By means of the procedure represented diagrammatically in FIG. 6, the average number of comparisons to be performed is reduced to 3-4, while with the procedure explained with reference to FIG. 5 and average of 16 comparisons were required (starting with a dither matrix with 32 thresholds), which means a significant reduction of the time required to complete the procedure.

A further reduction can be obtained if better use is made of the above mentioned weight that can be allocated to each vector b. To start with, each vector y and b is written as a series of ones and zeroes ordered in ascending sequence of the associated thresholds. FIG. 7a represents a simplified 4×4 dither matrix with 16 gray level thresholds.

FIG. 7b represents as an example the standard pattern for the threshold 5, i.e., a 1 is allocated to all the thresholds ≦5 and 0 an is allocated to all the thresholds >5. If this pattern is written as a series of ones and zeroes in ascending threshold sequence, the result is a series with a number of ones at the beginning until the threshold associated with this standard pattern is reached and then the series is continued with a number of zeroes as indicated below.

| Threshold | 1 2 3 4 5 6 7 8 9 | 10 | 11 | 12 | 13 | 14 | 15 | 16 |
|---|---|---|---|---|---|---|---|---|
| y-series | 1 1 1 1 1 0 0 0 0 | 0 | 0 | 0 | 0 | 0 | 0 | 0 |

If a standard pattern is now offered without being known to which gray level threshold this pattern is associated with we have to find that value of i for which the Hamming distance $d(y, b_i)$ is minimal. This distance can be split into two subdistances, i.e.:

$d_1(i)$ = the distance between y and $b_i$ in the vector coordinates 1 to i $d_u(i)$ = the distance between y and $b_i$ in the vector coordinates i+1 to n, if n is the maximum gray level.

Instead of looking for a minimal $d(y, b_i)$ it is thus possible also to look for the minimal sum of $d_1(i)+d_u(i)$. From the nature of the vectors $b_i$ and from the introduction ordering of the ones and zeroes in these vectors in accordance with the ascending threshold sequence it readily follows that $d_1(i)$ is the number of zeroes in the first i vector coordinates and $d_u(i)$ is the number of ones in the remaining vector coordinates i+1 to n. Both values can be determined iteratively. This results in the following calculation table for the pattern indicated in FIG. 7b:

| Threshold | 1 2 3 4 5 6 7 8 9 | 10 | 11 | 12 | 13 | 14 | 15 | 16 |
|---|---|---|---|---|---|---|---|---|
| y-series | 1 1 1 1 1 0 0 0 0 | 0 | 0 | 0 | 0 | 0 | 0 | 0 |
| $d_1(i)$ | 0 0 0 0 0 1 2 3 4 | 5 | 6 | 7 | 8 | 9 | 10 | 11 |
| $d_u(i)$ | 5 4 3 2 1 0 0 0 0 | 0 | 0 | 0 | 0 | 0 | 0 | 0 |
| $d_1(i) + d_u(i)$ | 5 4 3 2 1 1 2 3 4 | 5 | 6 | 7 | 8 | 9 | 10 | 11 |

As will be apparent from the foregoing table, the sum $d_1(i)+d_u(i)$ has a minimum between the thresholds 5 and 6, and this means that the average gray level in the pattern under examination has the threshold 5. This gray level determination can be performed in the same way if there is a high-frequency component in the pattern, i.e., if one or more pixels in the pattern deviate from the standard pattern. FIG. 7c represents a pattern deviating in this way, in which the pixel associated with the threshold 2 is not equal to 1 as in the standard pattern but is equal to 0, and in which the pixel associated with the threshold 11 is not equal to 0 as in the standard pattern but is equal to 1. The performance of the minimum determination for the pattern of FIG. 7c is as follows:

| Threshold | 1 2 3 4 5 6 7 8 9 | 10 | 11 | 12 | 13 | 14 | 15 | 16 |
|---|---|---|---|---|---|---|---|---|
| y-series | 1 0 1 1 1 0 0 0 0 | 0 | 1 | 0 | 0 | 0 | 0 | 0 |
| $d_1(i)$ | 0 1 1 1 1 2 3 4 5 | 6 | 6 | 7 | 8 | 9 | 10 | 11 |
| $d_u(i)$ | 5 4 4 3 2 1 1 1 1 | 1 | 1 | 0 | 0 | 0 | 0 | 0 |
| $d_1(i) + d_u(i)$ | 5 5 5 4 3 3 4 4 5 | 6 | 7 | 7 | 8 | 9 | 10 | 11 |

It is apparent from this diagram that here too the minimal value of the sum $d_1(i)+d_u(i)$ is found between the thresholds 5 and 6, and this means that the associated average standard pattern is that pattern for which a 1 is allocated to all the thresholds <5.

In order to determine the two series $d_u(i)$ and $d_1(i)$ it is only necessary to run through the vector series y twice, once forward and once back and then count up the individual components of the series found. This reduces still further the number of steps required to be performed in comparison with the previously-described methods. It is considered to be within the knowledge of a person skilled in the art to find both a hardware solution and a software solution.

A still further reduction is possible if, starting from a sufficiently high level, a series of numbers is produced in which each number is always one lower than a previous number if there is a 1 in the pattern at the position in question and each number is always 1 larger than the preceding number if there is a 0 in the pattern at the position in question. In that case too this series will have a minimum which, irrespective of the presence of a high-frequency component, is at the threshold corresponding to the average gray level pattern. An example of this is represented below with reference to the pattern of FIG. 7c.

| Threshold | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| y-series | 1 | 0 | 1 | 1 | 1 | 0 | 0 | 0 | 0 | 0 | 1 | 0 | 0 | 0 | 0 | 0 |
| Counter state | 16 | 17 | 16 | 15 | 14 | 15 | 16 | 17 | 18 | 19 | 18 | 19 | 20 | 21 | 22 | 23 |

It is apparent from the foregoing that the generated number series which started with a value 16, which value is sufficiently high to avoid the occurrence of negative numbers in the series even if the pattern consists completely of ones, has a minimum at the value 14 corresponding to the threshold 5 and this threshold therefore correspond to the average gray level pattern of the vector y. In carrying out this procedure, therefore, it is only necessary first to order the pattern in such a manner that the various ones and zeros occur in the pattern in the ascending sequence of the associated thresholds and then feed an up/down counter with these series and to detect where the minimum occurs in the series.

Embodiments of this both in hardware and in software are considered to be within the knowledge of a person skilled in the art on the basis of the above data and will therefore not be discussed in detail.

If the average gray level component has been found by means of one of the methods described in the foregoing, it is a simple matter, using an exclusive OR processing, to trace all those pixels which deviate from the standard pattern corresponding to this average gray level. For the example of FIG. 7 this would mean that the high-frequency component contains only a 1 at the positions of the thresholds 2 and 11 and otherwise contains only zeros.

Both the average gray level found and the high-frequency component then have to be subjected to an enlargement/reduction operation in the respective blocks 4 and 5 of FIG. 3, if desired at the same time as a second dither processing in the respective blocks 6 and 7 of FIG. 3.

If, for example, an image has to be reduced by a factor a/b, that means that each input area of b×b pixels must be imaged on an output area of a × a pixels. If a dither matrix b×b gray levels is used for dithering the input image and a dither matrix of a × a gray levels is used for dithering each output area, then once the average gray level of the input area is known it is possible to determine, for the associated output area, that standard pattern of a×a pixels which most closely approximates the same average gray level on the basis of the output dither matrix concerned. It will, however, be clear that in these conditions the number of gray levels in the output image is also reduced by a/b, and this is undesirable.

It is, therefore, preferable to select the second dither matrix (in the blocks 6 and 7 of FIG. 3) equal (at least insofar as concerns the number of gray levels) to the first dither matrix (in block 3 of FIG. 3). In that case, however, the dither matrix will generally no longer fit correctly on each output area. To be able to convert uniform gray areas faultlessly care must be taken to ensure that both the input areas and the output areas are well synchronized with the dither matrix to be used. FIG. 8 indicates how this synchronization can be obtained.

The solid lines of FIG. 8 indicates an array of input area A11, A12, ... A21, A22, ... etc. Each of these input areas has the same dimensions as the dither matrix used, in this example the dither matrix represented in FIG. 7a. This dither matrix is filled in in each of the area A11 .... The Figure also represents in dotted lines the output areas B11, B12, ... B21, B22, etc., on which the input areas with the same indices must be respectively projected. It will be clear from this Figure that with the dimensions selected a reduction by a factor of ¾ is aimed at. (Input areas of 4×4 pixels are imaged on output areas of 3×3 pixels.) The synchronization between the dither matrix used and the output areas B is maintained if a submatrix used for dithering each individual output area $B_{ij}$ is one which consists of those thresholds which in the Figure fall within the associated area $B_{ij}$. This means that the submatrix with which the area B12 has to be dithered consists of the thresholds 7 1 4 in the first row, the thresholds 13 8 14 in the second row, and the thresholds 9 11 5 in the third row. For this submatrix too, there is a series of standard patterns (nine in this case) and from this series of standard patterns there is selected that pattern with which the average gray level of the associated input area A12 is most closely approximated. By formulating various submatrices in this way the original dither matrix structure in fact is not affected and a faultless conversion is obtained of the average gray levels.

This technique can otherwise also be used if the dimensions of the input areas do not correspond to the dimensions of the first dither matrix. In that case too the gray level structure in the input areas is maintained by determining an auxiliary matrix for each input area in the manner described above.

It will be clear that auxiliary matrices can be similarly used in the enlargement of images, such auxiliary matrices also being found by placing a contiguous array of dither matrices on the contiguous array of output areas and each time forming an auxiliary matrix for a specific output area from the thresholds of the array of dither matrices which fall within the area in question.

Enlargement/reduction of the average gray level and dithering of the enlarged/reduced gray level is thus complete. All that remains is to enlarge/reduce the high-frequency component and its dithering respectively in blocks 5 and 7 of FIG. 3.

The high-frequency component of the input area can be imaged on the output area by linear coordinate transformation. The coordinates $x_0$, $y_0$ of an input area $A_{ij}$ of b×b pixels are imaged on the coordinates $x_c$, $y_c$ of the output area $B_{ij}$ of a×a pixels by the following simple linear coordinate transformation:

$$X_c = [a/b \times X_0]$$

$$Y_c = [a/b \times X_0]$$

[...] = rounding off

It should be noted here that each input and output area $A_{ij}$ and $B_{ij}$, respectively, has its own system of coordinates. For the above formulae, the left-hand top corner of each area is selected as the coordinate origin in each case.

These transformed high-frequency pixels are now written in the output area instead of the pixels associated with the average gray level pattern originally written in there as the result of the processing in block 6 of FIG. 3. The high-frequency pixels have a special information content and hence a higher priority and are all transferred to the output area in a one-to-one transformation from the input area so that practically nothing, if anything, is lost from the information content of the original image.

In the case of enlargement it is meaningful, depending on the enlargement factor, to image a high-frequency pixel from an input area on a number of pixels in the output area. In the case of enlargement by a factor of 2, in accordance with this, a high-frequency pixel from the input area is for example imaged on a group of four contiguous high-frequency pixels in the corresponding output area.

Before a high-frequency pixel is transformed to a corresponding pixel in the output area (or a plurality of pixels in the case of enlargement), a threshold is preferably introduced to include in the high-frequency component only those pixels which deviate from the average gray pattern in a predetermined manner. It has been found that if a correctly selected threshold difference is introduced the signal/noise ratio of the processed image (enlarged or reduced) is approximately equal to that of the original image. If, for example, the average gray level lies between the thresholds 6 and 7, and hence the standard pattern selected in block 4 of FIG. 3 has a 0 for all thresholds $\leq 7$ and a 1 for thresholds $> 7$, and if a minimum threshold difference of 2 is determined, then if the pixel associated with the threshold 8 is not equal to 1 but is equal to 0, this high-frequency pixel will not be included because the difference between the gray level of this pixel and the average gray level is too small.

After both the average gray level component and the high-frequency component are again available in dithered form in suitable manner in accordance with the foregoing, at the outputs of the blocks 6 and 7 in FIG. 3, both components are superimposed in block 8 by the fact that at those positions where a high-frequency pixel is present this pixel occurs instead of the corresponding pixel in the average gray level component. As a result, the enlarged or reduced image is delivered in dithered form at the output of the junction point 8.

While presently preferred embodiments of the invention have been shown and described in particularity, the invention may be otherwise embodied within the scope of the appended claims.

What is claimed is:

1. A method of enlarging/reducing a dithered pixel image obtained from a rastered gray level image by means of a dither matrix of rows and columns of picture elements (pixels) consisting of a unique combination of thresholds, comprising the steps of
    (a) defining contiguous input areas of b×b pixels in the dithered image, which input areas have to be imaged with a conversion factor of a/b on output areas of a×a pixels;
    (b) selecting from a series of standard patterns, each obtained by dithering, with a first dither matrix, an area filled uniformly with a unique gray level, that standard pattern which most closely approximates the dither pattern in the input area and allocating the gray level associated with the selected standard pattern to the input area to define the average gray level of the input area;
    (c) determining the pixels in the input area which deviate from the selected standard pattern;
    (d) generating for each output area a standard pattern by means of a second dither matrix, said pattern corresponding to the gray level determined for the corresponding input area; and
    (e) determining from the position of each of the deviating pixels within the input area the position of a corresponding pixel within the output area by linear transformation and allocating that pixel in the output area the same level as said deviating pixel in the input area.

2. A method according to claim 1, wherein the number of different thresholds of the second dither matrix of step (d) is equal to the number of different thresholds of the first dither matrix.

3. A method according to claim 1 or 2, wherein each of the deviating pixels determined in step (c) is allocated an amplitude level equal to the difference between the threshold associated with the pixel from the first dither matrix and the average gray level, and only those deviating pixels whose amplitude is greater than a predetermined threshold are imaged on the corresponding output area.

4. A method according to claim 1 or 2, wherein the numbers of rows and columns of elements of each input area are equal to those of the first dither matrix or a whole multiple thereof.

5. A method according to any one of the claims 1 or 2, including the step of each time using an auxiliary matrix when the numbers of rows and columns of elements of the first dither matrix are not equal to those of the input areas in step (b), said auxiliary matrix being determined separately for each input area by placing a contiguous array of first dither matrices on the contiguous array of input areas, such that the thresholds of the dither matrices which fall within each area together form the auxiliary matrix for that area.

6. A method according to claim 1 or 2, wherein an auxiliary matrix is used each time to generate the standard patterns associated with the various gray levels of the output area in step (d), said auxiliary matrix being determined separately for each area by placing a contiguous array of second dither matrices on the contiguous array of output areas, such that the thresholds of the dither matrices which fall within each area together form the auxiliary matrix for that area.

7. A method according to claim 1 or 2, wherein for enlargements in step (e), a deviating pixel from the input area is imaged on a number of pixels in the output area.

8. A method according to claim 1 or 2, wherein both the input areas and the output areas are so dimensioned that the dither matrix fits at least approximately a whole number of times both on the input areas and on the output areas.

9. A method according to claim 1 or 2, wherein in step (b) the sum is formed of the number of positions in which each of the standard patterns differs from the pixel pattern in the input area and the standard pattern for which said sum is minimal is selected as the average gray level pattern.

10. A method according to claim 1 or 2, wherein in step (b) an estimated gray level is first determined by counting the number of pixels having the value 1 in the input area, and the standard pattern having the same number of 1-levels is selected as estimated gray level pattern, and an iterative comparison of said estimated gray level pattern with the neighboring standard pattern, having a 1-level more or less each time, is applied to determine that pattern at which the number of deviating pixels is minimal, which pattern is selected as the average gray level pattern.

11. A method according to claim 1 or 2, wherein in step (b) the values of the pixels of an input area are ordered in a series in ascending sequence of the thresholds associated with each pixel from the first dither matrix and to each of the elements of said first series a value is allocated equal to the value allocated to the preceding element of the series increased by 1 if the element then reached from the series is a 0 or reduced by 1 if the element then reached is a 1, whereby a fixed predetermined value is allocated to the first element of the series, which allocated values form a new series which has a minimum at the value corresponding to the average gray level threshold.

12. A method according to claim 11, wherein the predetermined fixed value is at least equal to the number of elements of the first series.

13. A method according to claim 1 or 2, wherein in step (b) the values of the pixels of an input area are ordered in a series in ascending sequence of thresholds associated with each pixel from the first dither matrix and that to each of the elements of said first series a first value is allocated equal to the number of zeroes signalled on reaching the associated element on the passage of the series in ascending threshold sequence and a second value is allocated equal to the number of ones signalled on reaching the associated element on the passage of the series in the opposite direction, whereafter a new series is formed consisting of the sums of both allocated values, which second series has a minimum at the sum corresponding to the average gray level threshold.

* * * * *